(12) United States Patent
Sekijima (10) Patent No.: US 8,644,001 B2
(45) Date of Patent: Feb. 4, 2014

(54) ELECTRONIC APPARATUS

(75) Inventor: Masahiro Sekijima, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 358 days.

(21) Appl. No.: 13/053,067

(22) Filed: Mar. 21, 2011

(65) Prior Publication Data
US 2011/0235237 A1    Sep. 29, 2011

(30) Foreign Application Priority Data

Mar. 23, 2010    (JP) .................................. 2010-066667

(51) Int. Cl.
*H01G 7/02*    (2006.01)

(52) U.S. Cl.
USPC .......................................... 361/437; 720/673

(58) Field of Classification Search
USPC .......................................... 361/437; 720/673
See application file for complete search history.

(56) References Cited

U.S. PATENT DOCUMENTS 6,603,723 B2 *    8/2003    Minase ......................... 720/673

FOREIGN PATENT DOCUMENTS

| CN | 1115469 A | 1/1996 |
| CN | 1499808 A | 5/2004 |
| CN | 201322889 Y | 10/2009 |
| JP | 9-102732 A | 4/1997 |

* cited by examiner

*Primary Examiner* — Rexford Barnie
*Assistant Examiner* — Tien Mai
(74) *Attorney, Agent, or Firm* — Canon USA Inc IP Division (57) ABSTRACT

An electronic apparatus fixes a level to a level set by a level setting member when a detection unit detects that a lock member is operated to be brought into a lock state, and invalidates setting of the level made by the level setting member. After the detection unit detects that the lock member is operated to release the lock state, at the time the level setting member is operated, releases the fixation of the level.

4 Claims, 6 Drawing Sheets

ELECTRONIC APPARATUS

BACKGROUND OF THE INVENTION

1. Field of the Invention

The present invention relates to an electronic apparatus. More particularly, the present invention relates to an electronic apparatus having a level setting member that sets a level according to operation by a user and a lock member that engages with the level setting member so as to lock an operation of the level setting member when the user operates the apparatus to be in a lock state

2. Description of the Related Art

Generally, by operating a volume control arranged in an exposed state on an outer surface of an electronic apparatus, a recording level is adjusted. Further, it has been known a mechanism for locking a volume control such that an adjusted recording level is not changed even if the volume control is touched after the recording level is adjusted (see Japanese Patent Application Laid-Open No. 9-102732).

However, when the user tries to lock the volume control, the volume control may be slightly moved involuntarily and the adjusted recording level may be changed. For example, in the lock mechanism discussed in the Japanese Patent Application Laid-Open No. 9-102732, concavo-convex shapes are formed on both of the volume control and the lock member for locking the volume control. The two concavo-convex shapes engage with each other to lock the volume control. When the lock member locks the volume control, the convex shape of the volume control is about to engage with the convex shape of the lock member. At this time, the volume control is moved and the concave shape of the volume control engages with the convex shape of the lock member.

The slight movement of the volume control causes the change of the adjusted recording level.

SUMMARY OF THE INVENTION

The present invention is directed to an electronic apparatus including a level setting member configured to set a level according to operation by a user, a lock member configured to engage with the level setting member so as to lock the operation of the level setting member when the user performs operation to bring the setting member into the lock state, a detection unit configured to detect that the lock member is operated to be brought into the lock state before the lock member engages with the level setting member, and a control unit configured to fix the level to a level set by the level setting member at the time the detection unit detects that the lock member is operated to be brought into the lock state, and after the detection unit detects that the lock member is operated to release the lock state, when the level setting member is operated, release the fixation of the level. The control unit invalidates the setting of the level by the level setting member when the detection unit detects that the lock member is operated to be brought into the lock state, and when the detection unit detects that the lock member is operated to release the lock state, validates the setting of the level by the level setting member.

According to the present invention, even when the lock member engages with the level setting member for setting a level and the operation of the level setting member is restricted, the set level is not changed due to the engagement of the level setting member with the lock member.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1:
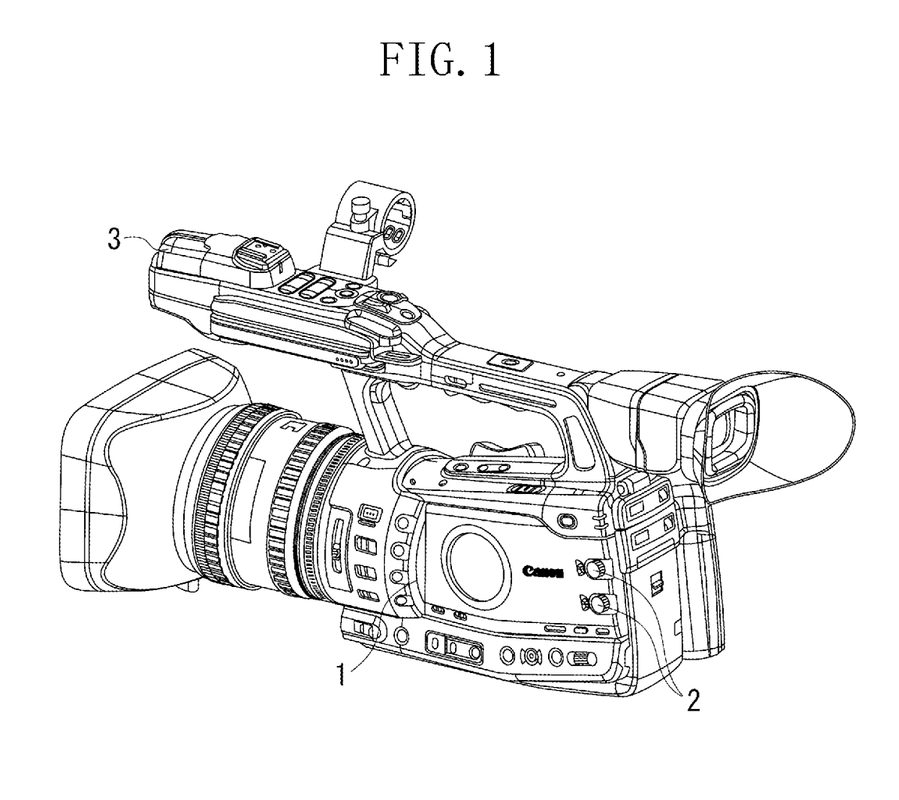
FIG. 1 is a perspective view illustrating a video camera according to an exemplary embodiment of the present invention.

FIG. 1 is a perspective view of a video camera as an example of an electronic apparatus according to an embodiment of the preset invention. The video camera has a recording level setting dial that serves as a level setting member for setting a recording level by rotating operation. In FIG. 1, reference numeral 1 denotes a video camera and reference numeral 2 denotes a recording level setting dial. The video camera 1 has two recording level setting dials 2. Recording levels of channels 1 and 2 in a microphone 3 can be separately adjusted.

Figure 2:
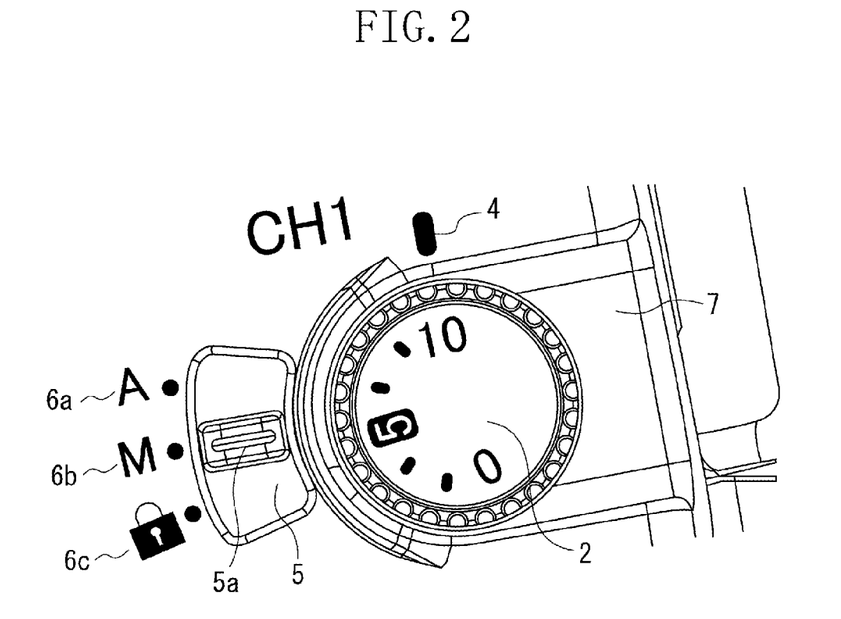
FIG. 2 is an enlarged view of a periphery of a recording level setting dial.

FIG. 2 is an enlarged view of a periphery of the recording level setting dial 2. The video camera 1 has the two recording level setting dials. However, both of the dials have the same structure. Accordingly, for the sake of simplicity, one recording level setting dial is described. The recording level setting dial 2 can be rotated within a predetermined range by a user of the video camera 1. The recording level setting dial 2 is fixed to a rotary volume mounted on a base 12, for example, by press-fit. By rotating the recording level setting dial 2, the rotary volume is rotated and the recording level can be set. More specifically, when the user adjusts a recording level (in the description, from zero to ten) indicated on the recording level setting dial 2 to an index 4, the user can set the intended recording level.

In the vicinity of the recording level setting dial 2, a lock operation member 5 that is a part of a lock member is concentrically arranged around the rotation center of the recording level setting dial 2. A lock knob 5a formed on the lock operation member 5 can be shifted to three positions indicated by lock knob position indexes 6a to 6c. The indication "A" of the lock knob position index 6a means an automatic position. When the lock knob 5a is positioned at the indication "A", setting of the recording level can be automatically performed. In this case, the recording level set by the recording level setting dial 2 is invalidated, and the recording level corresponding to the rotational position of the recording level setting dial 2 is not set.

The indication "M" of the lock knob position index 6b means a manual position. When the lock knob 5a is positioned at the manual position, the setting of the recording level made by the recording level setting dial 2 is validated. Then, the recording level corresponding to the rotational position of the recording level setting dial 2 is set.

The mark of a key at the lock knob position index 6c means a lock position indicating a lock state for locking the recording level setting dial 2. When the lock knob 5a is positioned at the lock position, the recording level setting dial 2 is locked and the rotation of the recording level setting dial 2 is restricted. Further, the recording level set when the lock knob 5a is at the manual position can be electrically fixed. Both of the recording level setting dial 2 and the lock operation member 5 are mounted on an external cover 7 of the video camera 1.

The structure of the recording level setting dial 2 and its periphery is described in detail with reference to FIGS. 3 to 5.

Figure 3:
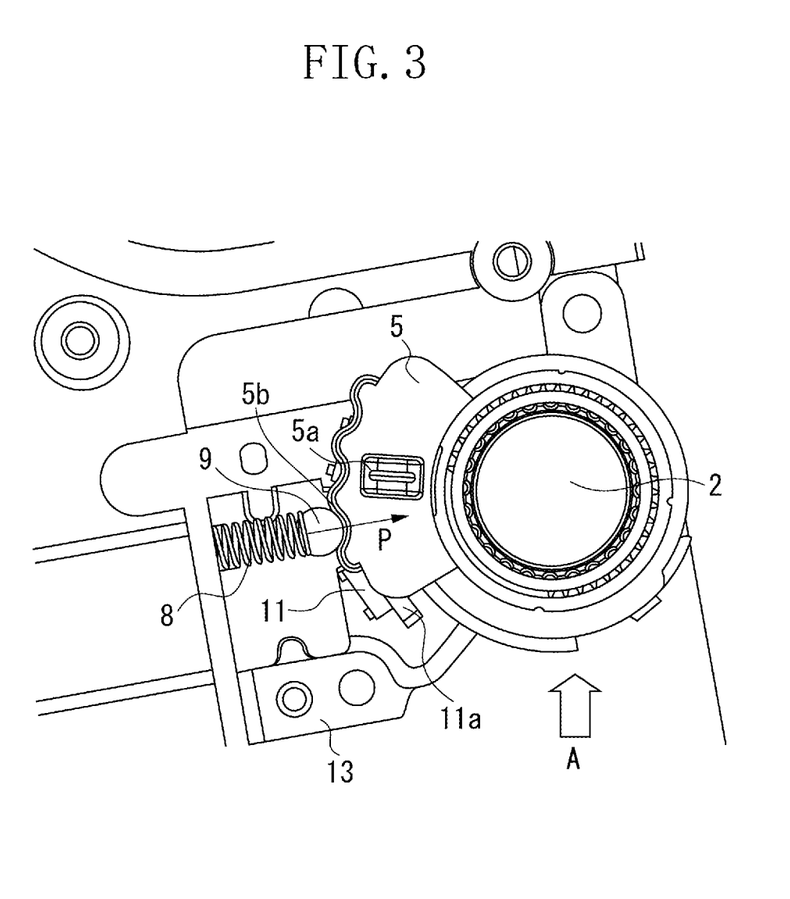
FIG. 3 is an enlarged view of a periphery of the recording level setting dial in which an external cover is omitted.
Figure 4:
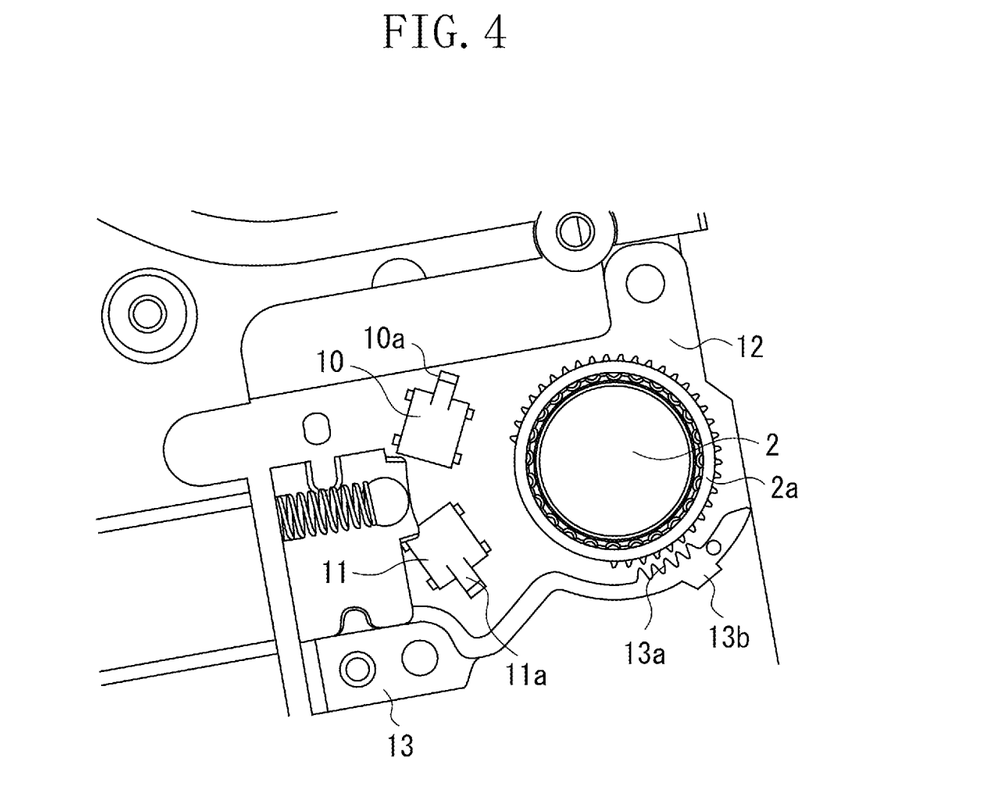
FIG. 4 illustrates a state where a lock operation member is further omitted from FIG. 3.

FIG. 3 is an enlarged view of the periphery of the recording level setting dial 2 in which the external cover 7 is omitted. As shown in FIG. 3, a spring 8 presses a ball 9 in the direction of the arrow P in FIG. 3, and the ball 9 engages with a lock knob groove position 5b. The engagement holds the lock knob 5a at each position of the lock knob position indexes 6a to 6c while giving the lock operation member 5 a sense of click.

The state shown in FIG. 3 illustrates the lock knob 5a at the automatic position. FIG. 4 further illustrates a state in which the lock operation member 5 is omitted from FIG. 3. As shown in FIG. 4, under the lock operation member 5, a first detection switch 10 and a second detection switch 11 for detecting rotating operation of the lock operation member 5 are provided on the base 12.

The first detection switch 10 has a protrusion 10a. When the lock knob 5a is shifted from the manual position to the automatic position, a protrusion 5c formed on the lock operation member 5 comes in contact with the protrusion 10a so as to push the protrusion 10a. Then, the first detection switch 10 is turned on. In response to the turning on of the first detection switch 10, a control unit in the video camera 1 invalidates the setting of the recording level made by the recording level setting dial 2 and performs control such that the setting of the recording level is automatically made.

On the other hand, when the lock knob 5a is shifted from the automatic position to the manual position, the contact of the protrusion 10a of the first detection switch 10 and the protrusion 5c formed on the lock operation member 5 is released, and the first detection switch 10 is turned off. In response to the turning-off of the first detection switch 10, the control unit in the video camera 1 deactivates the automatic setting of the recording level and performs control such that the setting of the recording level made by the recording level setting dial 2 is validated.

The second detection switch 11 has a protrusion 11a. When the lock knob 5a is shifted from the manual position to the lock position, the protrusion 5c formed on the lock operation member 5 comes in contact with the protrusion 11a so as to push the protrusion 11a, and the second detection switch 11 is turned on. In response to the turning on of the second detection switch 11, the control unit in the video camera 1 fixes the recording level to the recording level set by the recording level setting dial 2 when the second detection switch 11 is turned on. Then, the control unit in the video camera 1 performs control such that the setting of the recording level made by the recording level setting dial 2 is to be invalidated.

On the other hand, when the lock knob 5a is shifted from the lock position to the manual position, the contact of the protrusion 11a of the second detection switch 11 and the protrusion 5c formed on the lock operation member 5 is released, and the second detection switch 11 is turned off. In response to the turning-off of the second detection switch 11, the control unit in the video camera 1 performs control such that the setting of the recording level made by the recording level setting dial 2 is validated. In the operation, although the setting of the recording level by the recording level setting dial 2 is validated, the fixation of the recording level is not released but maintained until the recording level setting dial 2 is operated.

On the outer circumference of the recording level setting dial 2, an external gear-shaped first gear part 2a is formed. On an engage member 13 that is a part of the lock member, an internal gear-shaped second gear part 13a that meshes with the first gear part 2a is formed. The engage member 13 changes its state between the state the second gear part 13a meshes with the first gear part 2a and the state the second gear part 13a does not mesh with the first gear part 2a. When the second gear part 13a meshes with the first gear part 2a, the recording level setting dial 2 is locked, and the rotation of the recording level setting dial 2 is restricted. Accordingly, the lock operation member 5 and the engage member 13 serve as lock members.

The engage member 13 is mounted and fixed in the external cover 7 together with the recording level setting dial 2, the lock operation member 5, the spring 8, and the ball 9.

Figure 5:
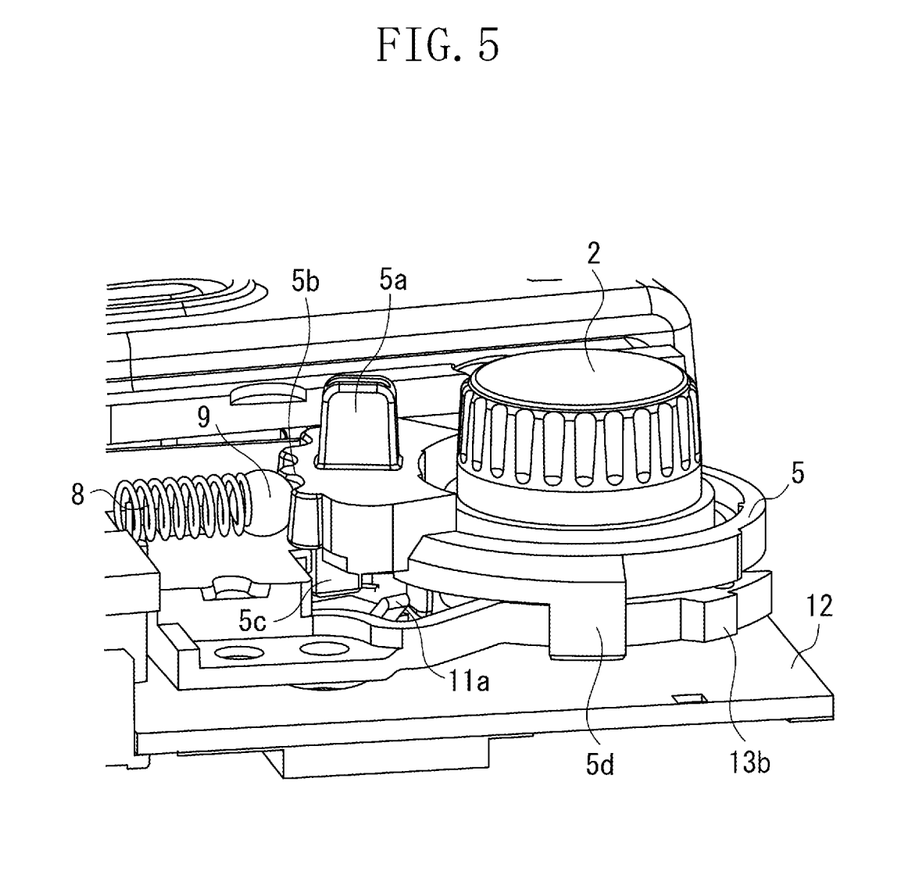
FIG. 5 is a perspective view from the A direction in FIG. 3.

FIG. 5 is a perspective view from the A direction in FIG. 3. When the lock knob 5a is shifted from the manual position to the automatic position, the protrusion 5c formed on the lock operation member 5 pushes the protrusion 10a formed on the first detection switch 10, and changes the first detection switch 10 from an off-state to an on-state. When the lock knob 5a is shifted from the automatic position to the manual position, the protrusion 5c formed on the lock operation member 5 is released from the protrusion 10a formed on the first detection switch 10, and the first detection switch 10 is changed from the on-state to the off-state.

When the lock knob 5a is shifted from the manual position to the lock position, the protrusion 5c formed on the lock operation member 5 pushes the protrusion 11a formed on the second detection switch 11, and the second detection switch 11 is changed from the off-state to the on-state.

More specifically, the lock knob 5a is shifted from the manual position to the lock position such that the second detection switch 11 is changed from the off-state to the on-state. Then, a contact portion 5d formed on the lock operation member comes in contact with a protrusion 13b formed on the engage member 13 and rides over the protrusion 13b. The protrusion 13b of the engage member 13 is formed on an outer side of the second gear part 13a. Accordingly, the contact portion 5d of the lock operation member 5 rides over the protrusion 13b of the engage member 13, displaces the second gear part 13a toward the first gear part 2a, and causes the second gear part 13a to mesh with the first gear part 2a.

When the second gear part 13a meshes with the first gear part 2a, except the case the convex-shaped parts of the second gear part 13a completely mesh with the concave-shaped parts of the first gear part 2a, the second gear part 13a meshes with the first gear part 2a after the recording level setting dial 2 is slightly rotated.

However, in the exemplary embodiment, the second detection switch 11 changes from the off-state to the on-state before the second gear part 13a meshes with the first gear part 2a. In the timing the second detection switch 11 changes from the off-state to the on-state, the recording level is fixed to the recording level set by the recording level setting dial 2 at the time. Further, the control is performed such that the setting of the recording level by the recording level setting dial 2 is invalidated. Accordingly, when the second gear part 13a meshes with the first gear part 2a, even if the recording level setting dial 2 slightly rotates, the recording level is not changed.

When lock knob 5a is shifted from the lock position to the manual position, the contact part 5d of the lock operation member 5 slides from the protrusion 13b of the engage member 13. At this time, the contact part 5d does not come in contact with the protrusion 13b. Accordingly, the second gear part 13a does not mesh with the first gear part 2a. Then, the protrusion 5c formed on the lock operation member 5 is released from the protrusion 11a formed on the second detection switch 11, and the second detection switch 11 is changed from the on-state to the off-state. In response to the change of the second detection switch 11 from the on-state to the off-state, the control unit in the video camera 1 performs control such that the setting of the recording level made by the recording level setting dial 2 is validated. In the operation, although the setting of the recording level by the recording level setting dial 2 is validated, the fixation of the recording level is not released and maintained until the recording level setting dial 2 is operated.

If the fixation of the recording level is released in response to the change of the second detection switch 11 from the on-state to the off-state, right after the lock knob 5a is shifted from the lock position to the manual position, the recording level involuntarily changes. More specifically, in such a structure, it is not possible to achieve the objective of making unmovable the once set recording level by the operation of the lock knob 5a.

In the exemplary embodiment, in response to the change of the second detection switch 11 from the on-state to the off-state, the setting of the recording level made by the recording level setting dial 2 is validated. Further, at the timing the recording level setting dial 2 is operated, the fixation of the recording level is released. In this structure, the objective of making unmovable the once set recording level by the operation of the lock knob 5a can be achieved.

Figure 6:
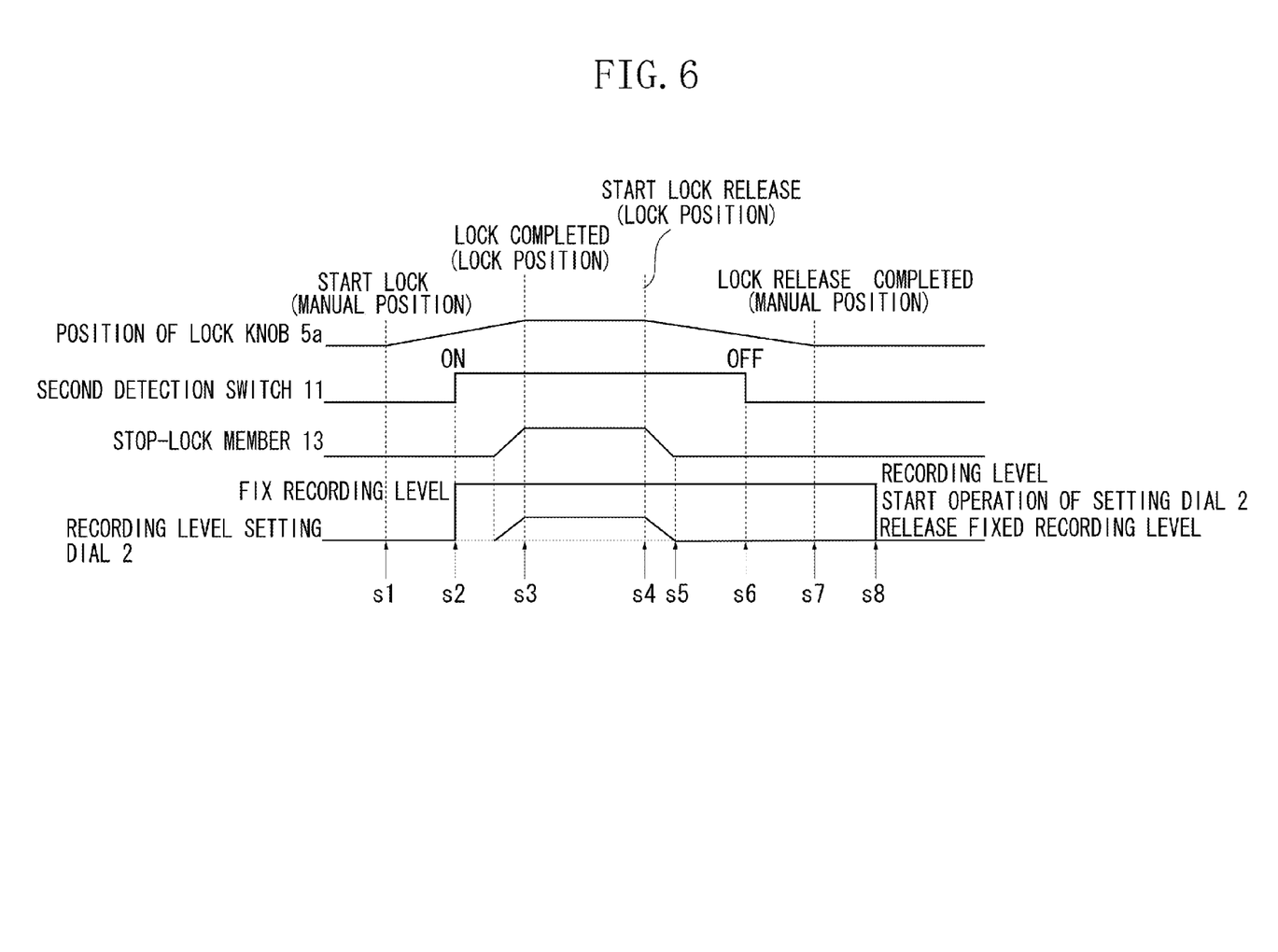
FIG. 6 is a timing diagram illustrating operation performed when a lock knob is shifted from a manual position to a lock position and when the lock knob is shifted from the lock position to the manual position.

FIG. 6 is the timing diagram illustrating the operation performed when the lock knob 5a is shifted from the manual position to the lock position and when the lock knob 5a is shifted from the lock position to the manual position.

The timing diagram shown in FIG. 6 illustrates the operation performed when the lock knob 5a is shifted from the manual position to the lock position, and then, shifted from the lock position to the manual position in chronological order.

First, the state in which the lock knob 5a is shifted from the manual position to the lock position is described. In state S1, the lock operation member 5 starts moving from the manual position to the lock position. In state S2, the protrusion 5c of the lock operation member 5 pushes the protrusion 11a of the second detection switch 11. Then, the second detection switch 11 is changed from the off-state to the on-state. The change of the second detection switch 11 from the off-state to the on-state triggers the fixation of the recording level, which is fixed to the recording level set by the recording level setting dial 2 at the time the second detection switch 11 is changed from the off-state to the on-state. Then, the control unit in the video camera 1 invalidates the setting of the recording level by the recording level setting dial 2.

After the second detection switch 11 is changed from the off-state to the on-state, the contact part 5d of the lock operation member 5 comes in contact with the protrusion 13b formed on the engage member 13 and rides onto the protrusion 13b. Then, the state proceeds to state S3. In state S3, the second gear part 13a meshes with the first gear part 2a, the recording level setting dial 2 is locked, and the rotation of the recording level setting dial 2 is restricted.

In this state, even if the recording level setting dial 2 rotates, the recording level is fixed and the setting of the recording level by the recording level setting dial 2 is invalidated. Accordingly, the recording level is not changed when the second gear part 13a meshes with the first gear part 2a.

Next, the state the lock knob 5a is shifted from the lock position to the manual position is described. In state S4, the lock operation member 5 starts moving from the lock position to the manual position. In state 5, the contact part 5d of the lock operation member 5 slides from the protrusion 13b of the engage member 13, and the contact part 5d does not come in contact with the protrusion 13b. Accordingly, in state S5, the second gear part 13a does not mesh with the first gear part 2a.

After the second gear part 13a does not mesh with the first gear part 2a, the protrusion 5c formed on the lock operation member 5 is released from the protrusion 11a formed on the second detection switch 11, and changes the second detection switch 11 from the on-state to the off-state, which is state S6. In state S6, in response to the change of the second detection switch 11 from the on-state to the off-state, the control unit in the video camera 1 validates the setting of the recording level made by the recording level setting dial 2. In this state, the recording level fixed in state S2 is not released, and the fixation of the recording level is maintained. In state S7, the lock knob 5a is in the manual position. In this state, the fixation of the recording level is still maintained. State S8 shows the timing the lock knob 5a comes to the manual position and the recording level setting dial 2 is rotated. In response to the rotation of the recording level setting dial 2 when the second detection switch 11 is in the off-state, the control unit in the video camera 1 releases the recording level fixed in state S2.

More specifically, even if the lock knob 5a is shifted from the lock position to the manual position, as long as the recording level setting dial 2 is not operated, the recording level set in state S2 is maintained. If the lock mechanism is configured such that the recording level set in state S2 is released simultaneously when the second detection switch 11 turns to the off-state, the recording level is involuntarily changed when the lock knob 5a is returned to the manual position. In other words, if the recording level changes when the lock knob 5a is returned from the lock position to the manual position, the recording level is unintentionally changed to a recording level different from the level intended by the user.

However, by deactivating the fixed recording level at the timing the recording level setting dial 2 is rotated after the lock knob 5a is returned from the lock position to the manual position, the above-described problem can be prevented.

Although the exemplary embodiment of the present invention applied to the video camera is described in detail, the present invention can be applied to any electronic apparatus other than the video camera without departing from the scope of the invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-066667 filed Mar. 23, 2010, which is hereby incorporated by reference herein in its entirety.

What is claimed is:

1. An electronic apparatus comprising:
a level setting member configured to set a level according to operation by a user;
a lock member configured to engage with the level setting member so as to lock the operation of the level setting member when the user performs operation to bring the lock member into a lock state;
a detection unit configured to detect that the lock member is operated to be brought into the lock state before the lock member engages with the level setting member; and
a control unit configured to fix the level to a level set by the level setting member at the time the detection unit detects that the lock member is operated to be brought into the lock state, and
invalidates the setting of the level by the level setting member when the detection unit detects that the lock member is operated to be brought into the lock state,
wherein the control unit maintains the level fixed by the level setting member until the detection unit detects that the lock member is operated to release the lock state and the level setting member is operated, and
wherein the control unit releases the level fixed by the level setting member when the detection unit detects that the lock member is operated to release the lock state and the level setting member is operated.

2. The electronic apparatus according to claim 1, wherein a first gear part is formed on the level setting member, and a second gear part that meshes with the first gear part is formed on the lock member, and the lock member is operated such that the first gear part meshes with the second gear part so as to lock the operation of the level setting member.

3. The electronic apparatus according to claim 2, wherein the level setting member is configured to set the level by rotating operation, and the lock member comprises a lock operation member configured to be rotated concentrically around the rotation center of the level setting member, and an engage member having the second gear part, which is configured to change its state between a state the second gear part meshes with the first gear part and a state the second gear part does not mesh with the first gear part.

4. An electronic apparatus comprising:
a level setting member configured to set a level according to operation by a user, the level setting member including a first gear part formed thereon;
a lock member including a second gear part meshing with the first gear part, so as to lock the operation of the level setting member when the user performs operation to bring the lock member into a lock state;
a detection unit configured to detect that the lock member is operated to be brought into the lock state before the lock member engages with the level setting member; and
a control unit configured to fix the level to a level set by the level setting member at the time the detection unit detects that the lock member is operated to be brought into the lock state, and after the detection unit detects that the lock member is operated to release the lock state, when the level setting member is operated, release the fixation of the level,
wherein the control unit invalidates the setting of the level by the level setting member when the detection unit detects that the lock member is operated to be brought into the lock state, and when the detection unit detects that the lock member is operated to release the lock state, validates the setting of the level by the level setting member; and
wherein the level setting member is further configured to set the level by rotating operation, and the lock member comprises a lock operation member configured to be rotated concentrically around the rotation center of the level setting member, and an engage member having the second gear part, which is configured to change its state between a state the second gear part meshes with the first gear part and a state the second gear part does not mesh with the first gear part.

* * * * *